United States Patent [19]

Raff et al.

[11] Patent Number: 4,900,914
[45] Date of Patent: Feb. 13, 1990

[54] WIDE-ANGLE VIEWING WINDOW WITH A PLURALITY OF OPTICAL STRUCTURES

[75] Inventors: Horst Raff, Oberkochen; Rolf Traeger, Aalen, both of Fed. Rep. of Germany

[73] Assignee: Carl-Zeiss-Stiftung, Heidenheim, Fed. Rep. of Germany

[21] Appl. No.: 198,491

[22] Filed: May 25, 1988

[30] Foreign Application Priority Data

May 27, 1987 [DE] Fed. Rep. of Germany ....... 3717906

[51] Int. Cl.$^4$ .......................... H01J 3/14; G02B 13/06
[52] U.S. Cl. .................................. 250/216; 250/203 R; 350/441
[58] Field of Search .................... 250/203 R, 221, 216; 356/141, 152; 350/451, 452, 447, 441

[56] References Cited

U.S. PATENT DOCUMENTS

| | | | |
|---|---|---|---|
| 2,917,980 | 12/1959 | Grube et al. | 350/447 |
| 3,263,088 | 7/1966 | Goldfischer | 356/141 |
| 3,448,272 | 6/1969 | Slater | 250/203 R |
| 3,987,297 | 10/1976 | Brienza et al. | 250/203 R |
| 4,138,192 | 2/1979 | Yamasita | 350/447 |
| 4,535,240 | 8/1985 | Vigurs | 350/452 |
| 4,554,447 | 11/1985 | Howard et al. | 250/216 |
| 4,554,459 | 11/1985 | Tsutsumi et al. | 250/221 |
| 4,625,108 | 11/1986 | Nestel et al. | 356/152 |
| 4,674,874 | 6/1987 | Halldorsson et al. | 250/203 R |
| 4,812,643 | 3/1989 | Talbot | 250/222.1 |

FOREIGN PATENT DOCUMENTS

| | | |
|---|---|---|
| 0103301 | 1/1987 | European Pat. Off. . |
| 977796 | 7/1970 | Fed. Rep. of Germany . |
| 2031971 | 4/1972 | Fed. Rep. of Germany . |
| 3106539 | 1/1982 | Fed. Rep. of Germany . |
| 3137733 | 4/1983 | Fed. Rep. of Germany . |
| 3513672 | 12/1985 | Fed. Rep. of Germany . |

Primary Examiner—David C. Nelms
Assistant Examiner—Michael Messinger
Attorney, Agent, or Firm—Walter Ottesen

[57] ABSTRACT

The invention is directed to a viewing window having a wide-angle view. This window is realized by subdividing the space to be viewed into sectors which requires the utilization of several different prismatic bodies.

8 Claims, 6 Drawing Sheets

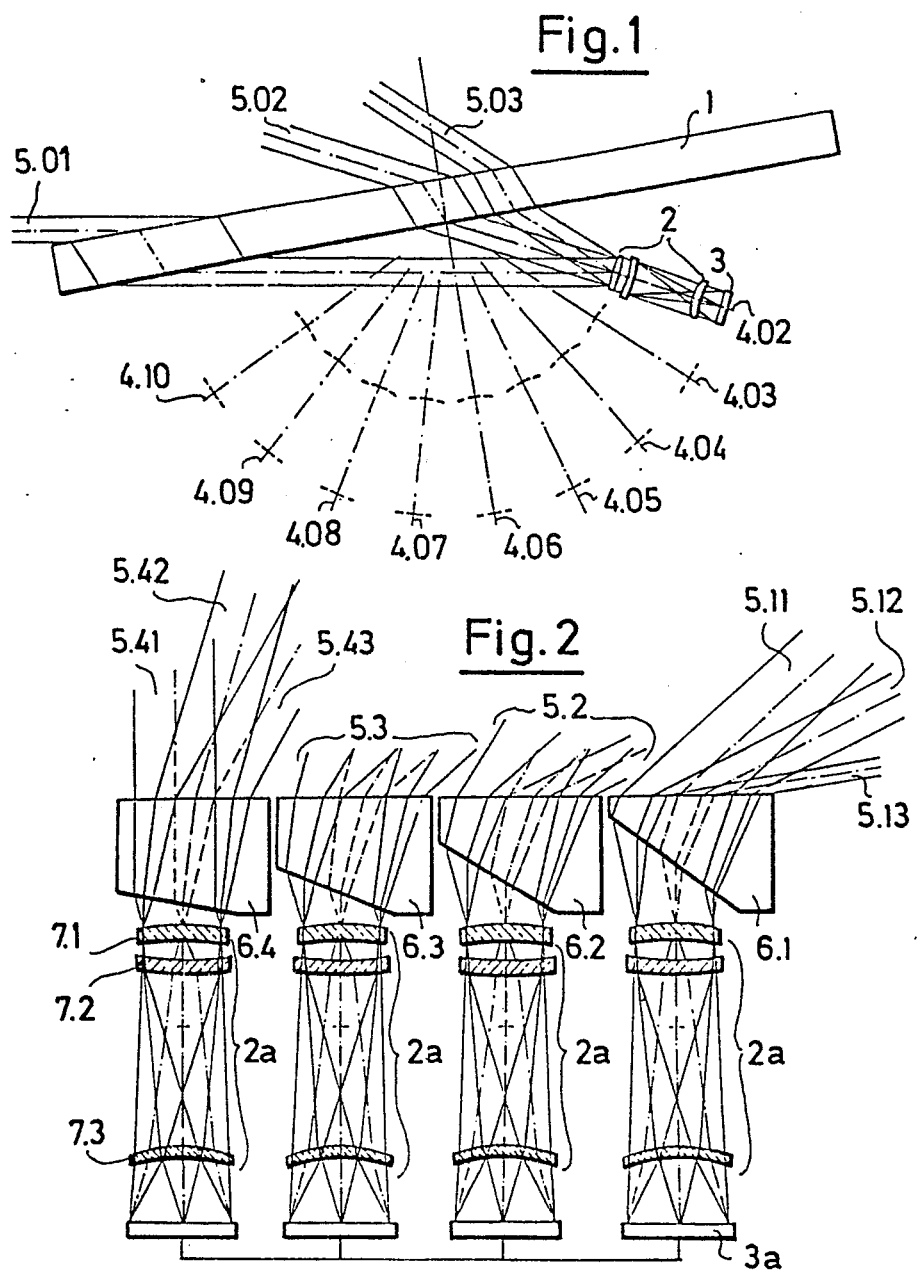

WIDE-ANGLE VIEWING WINDOW WITH A PLURALITY OF OPTICAL STRUCTURES

FIELD OF THE INVENTION

The invention relates to a viewing window which permits detecting radiation entering through the window within a wide-angle region.

BACKGROUND OF THE INVENTION

The viewing angle of objectives lies between 5° and 180° with the last-mentioned objective belonging to the so-called fish-eye lenses. However, all of these objectives have in common that one has no influence on the outer boundary surface (which cannot be configured so as to be planar) and with which quality reductions in the edge regions and distortions are unpreventable especially for large viewing angles. These limitations with respect to the outer geometric form and also with respect to the imaging quality are, however, unacceptable for specific applications. A wide-angle view is often needed for observation and control tasks wherein quality reduction cannot always be permitted within various regions.

German Patent No. 2,031,971 discloses an arrangement for viewing a large air space by means of an arrangement of objectives having a facet-like configuration and connected in a honeycomb-like manner. These objectives cause the arrangement to have an uneven outer boundary surface and set a minimum size for the arrangement below which the latter cannot be built.

Published German patent application DE-OS 3,106,539 discloses a lens strip for copier apparatus wherein a prism is mounted behind each lens. In this way, a planar outer limiting surface for the entry of rays is not realizable and also the desired wide-angle view is especially not realizable.

German patent publication DE-OS 3,137,733 discloses an IR viewing device for providing a panoramic view but where the entire apparatus is rotated. In contrast thereto, German patent publication DE-OS 3,513,672 describes a 360° viewing system wherein a mirror is needed in order to prevent blind angles.

A viewing head for periscopes is described in German patent No. 977,796 wherein a hemisphere is assembled from a plurality of plane-parallel plates.

European Patent No. 0,103,301 discloses an optical wide-angle arrangement having a horizontal viewing angle of 360°. In this arrangement, an annular reflecting prism is utilized by means of which the incident radiation is mirrored on an objective. With this arrangement, it is possible to realize a 360° panoramic view in a small solid-angle section with a planar outer limiting surface. The utilization of an optical annular lens for magnifying the solid-angle section, however, again leads to a nonplanar outer limiting surface of the viewing window. In addition, the arrangement does not permit assembling a plurality of annular reflecting prisms to magnify the viewable solid-angle section.

The disadvantage of the state of the art is seen in that a large solid-angle region for a viewing window having a planar or smooth outer surface cannot be realized and/or reductions in quality and distortions in the peripheral regions cannot be prevented without providing for a movement of the window.

SUMMARY OF THE INVENTION

It is an object of the invention to provide a viewing window for a wide-angle view which provides a large horizontal viewing angle and makes possible an optimal adaptation to photosensitive detectors when required.

According to a feature of the invention, the viewing window is made up of a plurality of different prismatically-effective regions with the individual regions being imaged onto at least one detector.

In contrast to the known viewing windows and according to the invention, a viewing window is provided for the first time which is assembled from a plurality of different prismatically-effective regions.

The prismatically-effective regions each deflect the radiation incident thereupon through a specific angle with each region providing a view into a limited solid-angle region. A view into the entire space is obtained by means of a plurality of different or differently aligned prismatically-effective regions.

The regions can be made of an optically uniformly effective material or from materials which are different in their optical effect. When selecting optical materials, it should be noted that a limitation of the viewable spectral range occurs with the viewing window as such being suitable for the visible, the infrared as well as the ultraviolet spectral ranges. For the visible spectral range, glass, for example, is suitable as an optical material and for the infrared spectral range, ZnSe, for example, is a suitable optical material while for the ultraviolet spectral range, a material such as quartz is suitable as an optical material.

The required prismatic bodies can be realized as wedges, prisms or rotationally-symmetric dispersion prisms depending upon the application. The dispersion prisms comprise a circularly-shaped annular member in which a part of the inner material is removed by means of an inclined cut so that the member which was previously a cylindrical ring now provides a rotationally-symmetric, dispersion-prismatic effect.

When assembling the viewing windows having prismatically-effective regions, it is to be noted that a total reflection is obtained starting with a critical angle and that even before this, a portion of the incident light is reflected. It is therefore advantageous to provide a surface coating with an anti-reflective layer of the outer limiting surface for the incident radiation in order to reduce the reflection losses for glancing incident light.

The chromatic magnification difference can be eliminated by a reduction of a viewed spectral range as can be achieved, for example, by utilizing a filter. An influence on the chromatic magnification difference as well as on the deflection angle can be effected especially through the selection of different optical materials. The disadvantages caused by dispersion and distortion can be entirely prevented only when prisms are utilized as prismatically-effective regions with the prismatic angle being freely selectable. It is decisive that the refraction of the entering rays is the same as the refraction of the exiting rays. It is also possible to configure the prisms from a plurality of parts and to cement the same or to separate these parts by an air gap. Separation by means of an air gap is possible so long as the critical angle of total reflection is not exceeded.

The invention permits the most different configurations and uses of material in order to arrive at an optimal result for the particular purpose in dependence upon the relevance of distortion and dispersion, the detection method to be utilized, the spectral range to be viewed as well as the requirements as to precision with respect to spatial resolution.

A special advantage of the viewing window made of prismatically-effective regions is the possibility to obtain a completely planar outer boundary surface of the viewing window. The window can be configured to be strip-like by means of a plurality of prismatically-effective regions which are placed linearly one next to the other by means of which a view into an almost complete 180° solid-angle section is possible. Such a strip-shaped segment can be rotated about an axis which is perpendicular or parallel to the outer boundary surface or which can occupy every other angle therebetween with respective solid-angle sections being scanned sequentially to obtain a 360° panoramic view with only one region which cannot be looked into and with this one region having a magnitude which is double the size of the critical angle of the total reflection. However, it is also possible to build up a matrix from the prismatically-effective regions by means of which one obtains a view into a hemisphere by rotating the prismatically-effective regions with respect to the main section plane. Such a viewing window can be rotated horizontally as well as vertically.

For other applications, it is advantageous to build a circular polygon from the prismatic bodies. In this way, a facet-like outer boundary surface is obtained. The utilization of prismatic bodies to build up a circularly-shaped polygon affords the advantage that the individual viewing regions can be looked into without distortion with detector arrays or detector lines.

In lieu of the circularly-shaped polygon made of prismatic bodies, a prismatic strip or a prismatic plate can be rotated and if required, the circularly-shaped polygon can be replaced by a rotationally-symmetric dispersion prism when utilizing detector lines.

By placing a plurality of circularly-shaped polygons made up of prismatic bodies one on top of the other, almost an entire 360° panoramic view of the space is obtained with the limitation of the total reflection with angles which are too flat. If the viewing dome made up of the above-mentioned circular-shaped polygons stacked one on top of the other is configured as a truncated cone wherein the angle of inclination of the truncated cone is to correspond to the angle of the total reflection, then there is only a small region directly beneath the viewing dome into which one cannot look and whereat the viewing dome can be supported.

Furthermore, the assembly of the viewing window from a plurality of prismatic bodies has the further decisive advantage that the magnitude of the solid-angle sections can be freely selected and the attachment of the individual prismatic bodies can be undertaken between the individual sections in such a manner that the entire viewing window can withstand a very high pressure loading. These advantages are also provided by the viewing dome.

If an optically flat plate is provided, then an objective-detector combination can be moved on a hemispherical-like surface to change the inclination of the optical axis of the combination with respect to the surface normal to the optically flat plate with the reception of the images taking place at discrete positions.

In lieu of moving an objective-detector combination, several combinations can be moved or the objective-detector combinations can be stationary in various receiving positions.

A focusing of the incident rays onto a radiation-sensitive detector can occur behind the prismatic bodies of the viewing window. The solid-angle regions are then focused by means of several prismatic bodies onto one or more detectors for which it is especially advantageous to provide for the regional enlargement of specific solid-angle regions on several detectors. However, an objective with a detector disposed therebehind can also be placed behind each prism. The focusing upon the specific distances can be obtained by utilizing variable-focus objectives as may be required. What was stated above with respect to the material of the prismatic bodies should also be observed with respect to the material selected for the objectives.

The detectors for receiving the images can be in point form, line form or also matrix form. The geometric form is determined by the particular task to be performed. If a specific detector type is required when assembling a viewing window and the image is imaged by a plurality of prismatic bodies onto a detector, it is then advantageous to place the shadowing which results between individual prismatic bodies between the radiation-sensitive surfaces available on the detectors as may be required. In this way, an image on the detector is obtained from which the formation behind the plurality of prismatically functioning regions is no longer recognizable.

The position of the detector can be stationary or movable with respect to prismatically-active regions as well as to the objectives. For movable detectors, the detection can take place at stationary receiving positions or from the movement.

A three-dimensional evaluation of the viewing space is possible by means of a multiple stacking of the solid-angle section to be viewed. The three-dimensional evaluation can especially be a distance determination or a movement detection. Also, a portion of the image generated on the detector can be utilized for assembling an overview image whereas by using overlapping parts as an aid, a distance determination by means of stereoscopic evaluation can occur.

By means of multipixil correlation, an image improvement can occur by means of increasing the image resolution as well as a size determination of the imaged object.

The correction of image distortions can occur directly on the prismatic body, on the objective, by changing the position of the detector or by means of image processing.

A protective window can be located ahead of the smooth outer surface of the viewing window made of prismatic bodies. The prismatic bodies can be tightly connected with this protective window or be optically coupled by means of an intermediate medium.

In the intermediate space between the actual viewing window and the protective window, a gas or a liquid having an index of refraction greater than or equal to the material of the window can be disposed in an advantageous manner. Furthermore, this coupling medium can be utilized to effect a cooling of the window when there is an intense thermal loading.

BRIEF DESCRIPTION OF THE DRAWINGS

The invention will now be described with reference to the drawings wherein:

FIG. 1 is a wide-angle view from behind a plane-parallel plate with a movable objective-detector combination;

FIG. 2 is a cut-away portion of a viewing window made up of prismatic bodies with an objective-detector combination disposed behind each prismatic body;

DESCRIPTION OF THE PREFERRED EMBODIMENTS OF THE INVENTION

Figure 3:
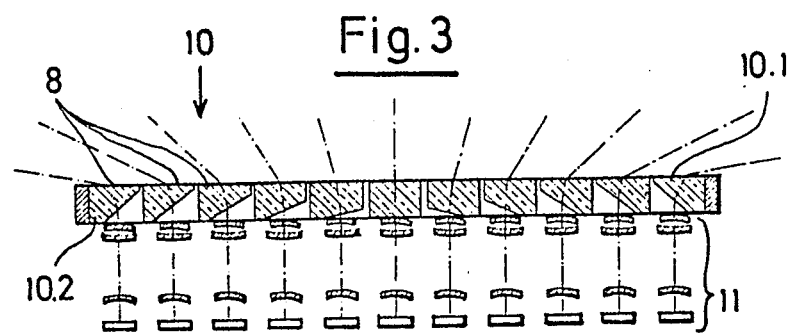
FIG. 3 is a section taken through a viewing window assembled from prismatic bodies wherein the boundary surfaces of the prismatic bodies are perpendicular to the outer boundary surface of the viewing window.

FIG. 1 shows the realization of a wide-angle view behind a transparent plane-parallel or optically flat plate 1 with an objective-detector combination (2, 3). To receive the total image, the objective-detector combination (2, 3) is moved behind the transparent flat plate 1 on a hemispherical-like surface to change the inclination of the optical axis of the combination (2, 3) with reference to the surface normal of the flat plate 1. The image pick-up then occurs in discrete positions (4.02 to 4.10). The precise imaging positions 4 of the combination (2, 3) result from the optical characteristics of the transparent flat plate 1. The total image is then put together from the recordations made in the discrete positions 4. The three representative beam paths (5.01 to 5.03) show the region which is seen by the detector 3 through the objective 2 in the instantaneous receiving position 4.02.

In lieu of the movement of one objective-detector combination (2, 3), a plurality of combinations can be moved or a plurality of combinations (2, 3) can be stationary in different recording positions (4.02 to 4.10).

FIG. 2 is a cut-away portion of a viewing window assembled from prismatic bodies (6.1 to 6.4) and shows objective-detector combinations (2a, 3a) behind respective ones of the prismatic bodies (6.1 to 6.4). The objective 2a itself is assembled from three individual lenses (7.1 to 7.3). Any suitable radiation-sensitive data sensor for the particular spectral range can be used as a detector 3a with the inner assembly thereof being unimportant and the configuration of its measuring surface (point, line, array) being dependent upon specific requirements. The form of the prismatic bodies (6.1 to 6.4) is different for different positions by means of which a different angular region is detected. The particular portion of the view through the individual prismatic bodies (6.1 to 6.4) is emphasized by means of the representative beam paths (5.11 to 5.43).

FIG. 3 shows a section taken through a viewing window 10 which makes possible an arrangement of the objective-detector combination 11. An objective-detector combination 11 is disposed behind each prismatic body 8 of the viewing window 10. The special advantage of the viewing window 10 is made particularly clear in FIG. 3. Even though the outer boundary surface 10.1 of the viewing window 10 is completely planar, an optical effect is obtained which makes possible a view into an angular region which is only limited by the critical angle of the total reflection. This optical effect is achieved by means of the special contour of the inner surface 10.2 of the prismatic bodies 8 of the viewing window 10. The lengthening of the optical axis of each objective-detector combination 11 is shown for each prismatic body 8. The assembly of the viewing window 10 out of many individual prismatic bodies 8 provides the possibility of obtaining a very high pressure loadability between the individual bodies by means of the nature of the attachment between the individual prismatic bodies 8. Accordingly, the invention permits a large viewing window 10 to be provided for a wide-angle view having an extremely high mechanical strength.

Figure 4:
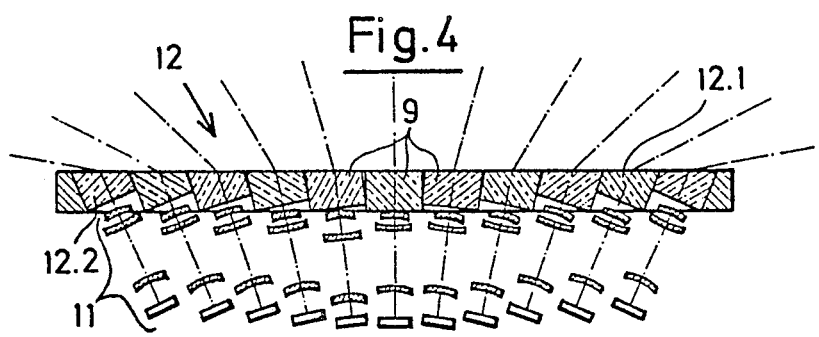
FIG. 4 is a section view in the manner of FIG. 3 with the boundary surfaces of the prismatic bodies being inclined to the outer boundary surface of the viewing window.

FIG. 4 shows a section through a viewing window 12 wherein the objective-detector combinations 11 are in different inclined positions with respect to the surface normal of the outer boundary surface 12.1. The outer boundary surface 12.1 of the viewing window 12 is completely smooth as in the embodiment of FIG. 3 and the optical effect is obtained only by means of the contour of the inner side 12.2 of the prismatic bodies 9 of the viewing window 12. A change in angle of the exiting rays to the surface normal of the viewing window results because of the prismatic body 9. It is for this reason that the objective-detector combination 11 must compensate for the angle change by means of a corresponding alignment. FIG. 4 shows the extension of the optical axis of each objective-detector combination 11 through the prismatic body 9 into the space ahead of the viewing window 12.

Figure 5:
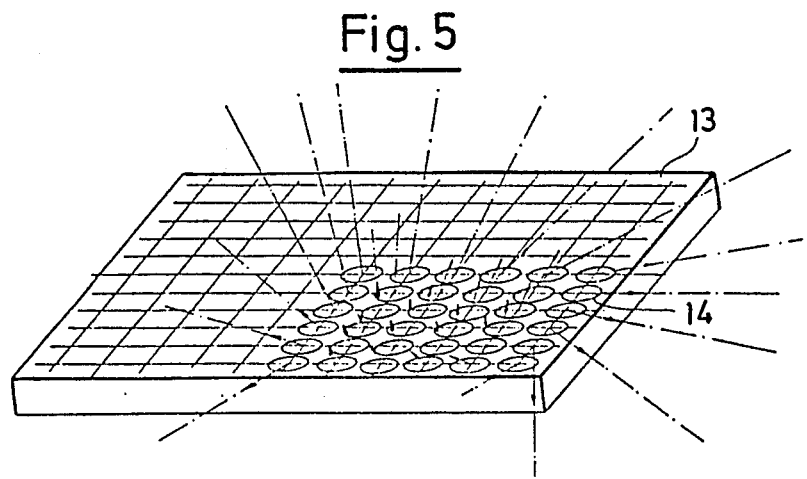
FIG. 5 is a plan view of the viewing window array made up of prismatic bodies.

FIG. 5 shows a viewing window 13 assembled out of a two-dimensional matrix of round prismatic bodies 14. The prismatic bodies 14 are so rotated that they are only limited by the total reflection which makes possible a complete view into a hemisphere. For each of the prismatic bodies 14, FIG. 5 shows the extension of the optical axis of each objective-detector combination through the individual prismatic bodies 14 into the space ahead of the viewing window 13.

The prismatic bodies 14 need not have a circularly-shaped or elliptically-shaped surface; instead, quadrilateral or even triangular prismatic bodies can be used. The round form is shown here only because it is convenient for esthetic reasons.

The viewing window 13 as such need only be made of a line or column of the matrix when a view is required only in a limited spatial region.

Figure 6:
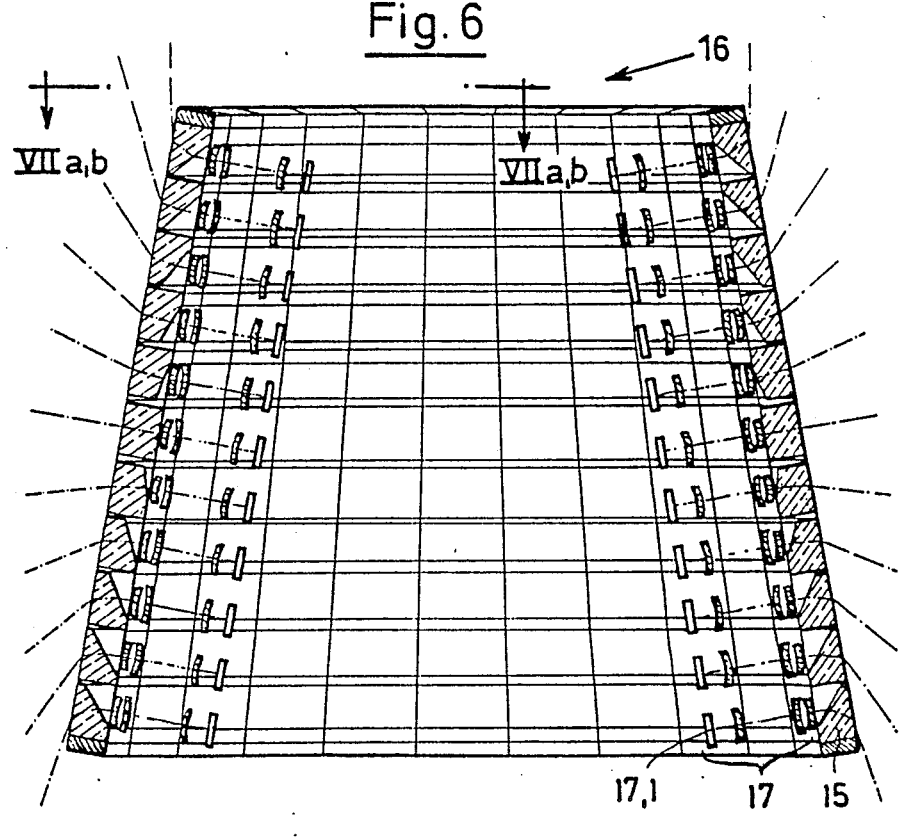
FIG. 6 is a section view taken through a viewing dome.

A viewing dome 16 assembled from the prismatic bodies 15 is shown in FIG. 6. An objective-detector combination 17 is disposed behind each prismatic body 15 by means of which a definite solid-angle section is viewed. For each of the prismatic bodies 15, FIG. 6 shows the extension of the optical axis of each objective-detector combination 17 through the prismatic body 15 into the space ahead of the viewing dome 16. The form of the prismatic bodies 15 can correspond to a ring as shown in FIG. 6 or, a certain spatial region can be viewed in more detail by means of an individual contour of the prismatic bodies 15. A full sphere can be imaged onto the detectors 17.1 without distortion when a plurality of annular members made up in this manner are placed one on top of the other. In the lower viewing region, only a region having twice the size of the critical angle of the total reflection cannot be viewed and it is for this reason that it is practical to support the viewing dome 16 at this location. In lieu of the plurality of objective-detector combinations 17, a suitable moving device can move one or more objective-detector combinations 17 in the dome in such a manner that the individual fixed receiving positions are reached sequentially. A suitable holding arrangement between the prismatic bodies 15 provides for a high mechanical pressure loadability of the viewing dome 16.

Figure 7A:
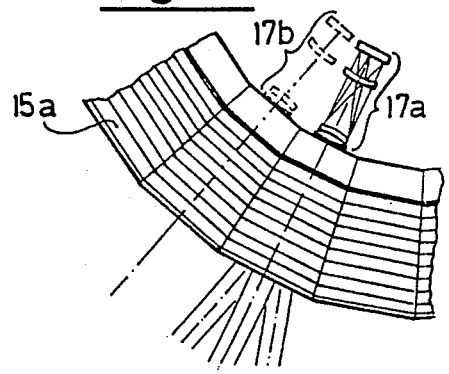
FIG. 7a is a portion of a prismatic annular member made up of a plurality of prismatic bodies.

FIG. 7a shows a section taken through FIG. 6 so that a view is provided onto a circle of like prismatic bodies 15a. An objective-detector combination 17a is disposed behind a prismatic body 15a. For the two prismatic bodies 15a ahead of the objective-detector combinations (17a, 17b), the extension of the optical axis of the objective-detector combinations (17a, 17b) is shown as is the angular section which can be viewed through the prismatic body 15 ahead of the objective-detector combination 17a. The combination 17a is moved in the clockwise direction after the reception and reaches the position 17b shown in phantom outline as the next receiving position. The rotation occurs about the rotational axis 18.

Figure 7B:
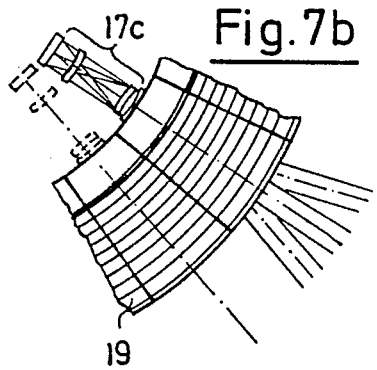
FIG. 7b shows a portion of a prismatic annular member.

A possible section taken through FIG. 6 is shown in FIG. 7a and is illustrated such that the view is onto a prismatic circular body 19 behind which an objective-detector combination 17c rotates into respective discrete receiving positions about the rotational axis 20. More specifically, the radiation values of specific angular regions are added together and are transmitted as a common value. The prismatic circular body 19 can also be undivided (not shown in FIG. 7b).

Figure 8:
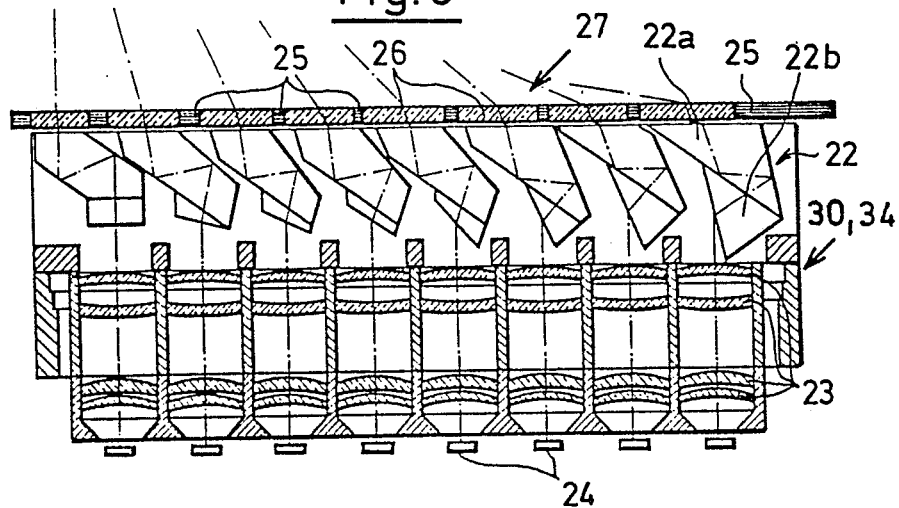
FIG. 8 is a viewing window made up of prisms.

FIG. 8 shows a viewing window 22 which utilizes prisms (22a, 22b) as prismatic bodies. The prismatic angles are freely selectable as such and result as a consequence of the specific angular sections to be viewed for the viewing window 22. The disadvantages of dispersion and distortion can be entirely prevented by utilizing prisms (22a, 22b). What is decisive for the correct function is that the refraction of the entering ray is the same as the refraction of the exiting ray. The prism parts (22a, 22b) can be cemented or be mutually separated by an air gap. The last condition can be realized as long as the critical angle of the total reflection is not exceeded. Housings (30, 34) for the objective-detector combinations (23, 24) are located behind corresponding ones of the prisms (22a, 22b). A protective window 27 is shown in FIG. 8 and is located ahead of the viewing window 22 made of prisms (22a, 22b). This protective window 27 has reinforcements 25 between the optically transparent regions 26 to increase the mechanical strength. The optically transparent regions 26 of the protective window 27 are attached in these reinforcements 25.

Figure 9:
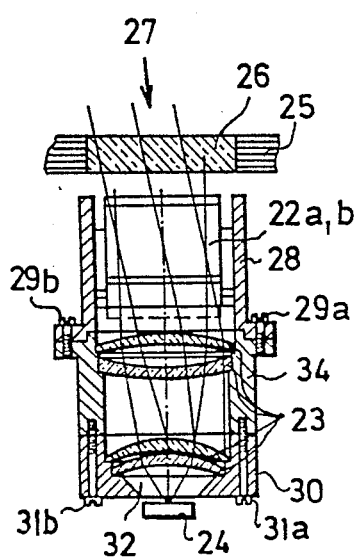
FIG. 9 is a detail section view taken through the viewing window of FIG. 8.

FIG. 9 shows a detailed embodiment of a portion of FIG. 8 and shows that the viewing window is made up of prisms (22a, 22b). The prism (22a, 22b) is held in a prism holder 28 which is attached to the housing (34, 30) for the optics 23 with threaded fasteners (29a, 29b). The optical housing (34, 30) is made up of two parts for receiving respective ones of two lenses 23. The detector 24 is seated on the lower side of the lower housing part 30. This housing part 30 is fastened to the upper housing part 34 by threaded fasteners (31a, 31b) as shown. In the interior, the lower housing part 30 is formed in correspondence to the lower lens pair 23 so that a radiation limiter 32 results from the form of the housing ahead of the detector 24.

Figure 10:
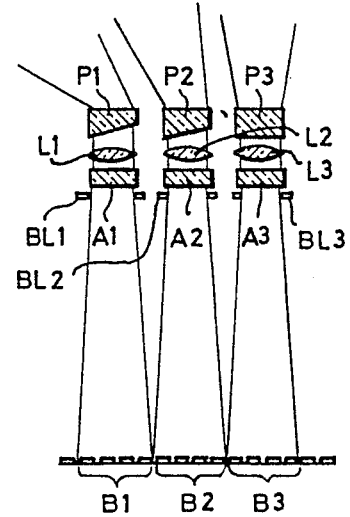
FIG. 10 is a schematic representation of an optimal imaging onto a detector having a plurality of photosensitive surfaces.

FIG. 10 shows a schematic of a viewing window wherein the imaging onto the detector B occurs by means of a plurality of prismatic bodies P. Radiation out of specific solid-angle regions is deflected by means of each of the prismatic bodies (P1, P2, P3). Prismatic bodies (A1, A2, A3) are disposed behind corresponding ones of the focusing bodies (L1, L2, L3). The spatial region to be imaged can be deflected to very specific regions (B1, B2, B3) of the detector B by means of the prismatic bodies (A1, A2, A3) with the diaphragms (BL1, BL2, BL3) making possible a precise limitation of the spatial region to be imaged. In this connection, it should be noted that the detector B is not photosensitive over its entire surface.

Figure 11:
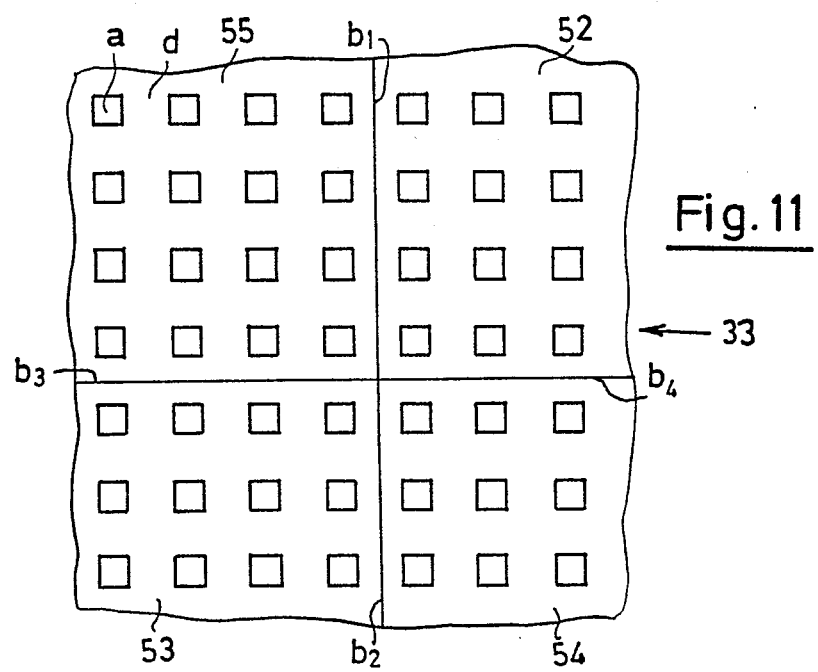
FIG. 11 is a detail view of the regions of FIG. 10 on a detector array.

FIG. 11 considers that a photosensitive detector 33 is made up of photosensitive surfaces (a) arranged in mutually adjacent rows. FIG. 11 shows a plan view of a detector array of a detector 33. The use of a detector 33 for detection through a plurality of prismatic regions has as a precondition that the regions imaged through the individual prismatic bodies can be relocated on the detector surface without difficulty. For this reason, it is advantageous to place the boundary lines (b1, b2, b3, b4) of the imaged regions between the photosensitive surfaces (a) of the detector. If one then views the individual regions (52, 53, 54, 55) which are imaged on the detector 33 by means of the prismatic bodies, then the boundary lines (b1, b2, b3, b4) lie on the region (d) of the detector 33 which is not photosensitive. When the prismatic bodies are adapted to the detector 33 so that no overlappings of the imaged regions occur, then an image of a wide-angle view is obtained for which the formation thereof cannot be seen and on which no disturbing lines are superposed.

Figure 12:
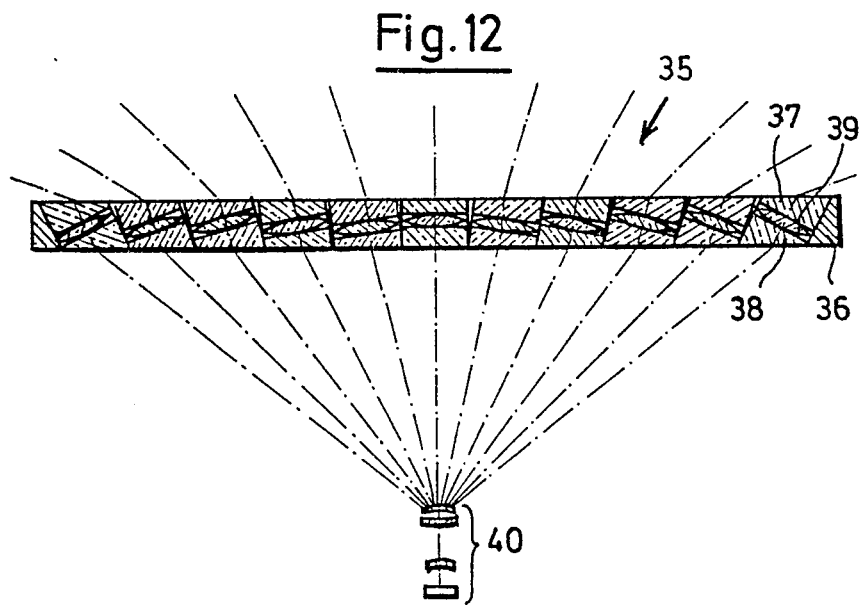
FIG. 12 is a viewing window wherein the viewing space is imaged onto a detector.

FIG. 12 shows the combination of a viewing window 35 made up of prismatic bodies (37, 38). The prismatic bodies 37 disposed on the outer side of the viewing window 35 serve as input surfaces for the incident rays. A deflection of the incident radiation onto the objective-detector combination 40 then occurs by means of the prismatic bodies 38 on the inner side. Between the prismatic bodies (38, 39), a focusing occurs by means of a body 39 having the operational effect of a lens whereby the rays are directed to a common focal point. A space-monitoring sensor can be assembled in a simple manner by means of this configuration. The prismatic bodies (37, 38) as well as the lens body 39 therebetween form a compact unit which obtains an adequate adapting strength with respect to pressure loads by means of the support 36.

Figure 13:
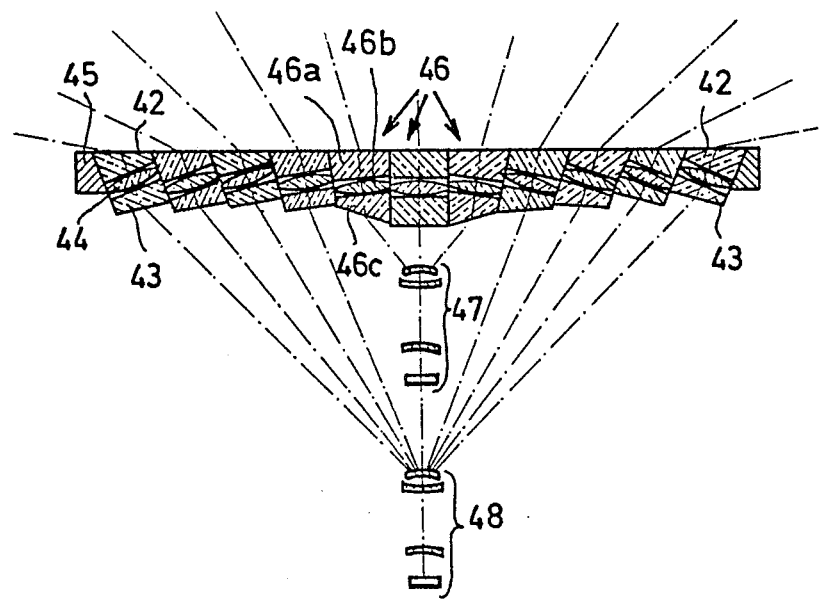
FIG. 13 is a viewing window according to the window shown in FIG. 10 with region magnification on a separate detector; and, FIG. 14 shows a viewing window curved inwardly and made up of prismatic bodies.

The embodiment of FIG. 13 is a variation of the embodiment shown in FIG. 12. In FIG. 13, an outer region is imaged onto a common objective-detector combination 48 by means of inner prismatic body 42 and outer prismatic body 43 as well as a body 44 having a lens-like operating effect. The inner region 46 is imaged onto the separate objective-detector combination 47 by means of the outer prismatic body 46a and the inner prismatic body 46c as well as a body 46b disposed therebetween and having a lens-like operating effect. This viewing window is held by the support 45.

Figure 14:
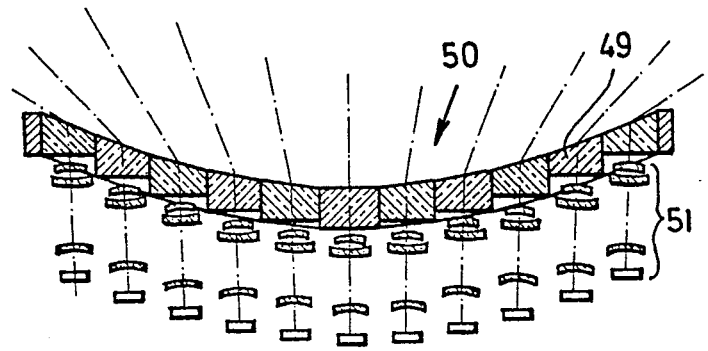

In FIG. 14, and in lieu of the flat outer surface of the previous embodiments, a viewing window 50 made up of prismatic bodies 49 is realized which is curved inwardly. Respective objective-detector combinations 51 are disposed behind the prismatic bodies 49 or an objective-detector combination 51 is moved into the corresponding receiving position behind the individual prismatic bodies 49 as shown in FIG. 1.

It is understood that the foregoing description is that of the preferred embodiments of the invention and that various changes and modifications may be made thereto without departing from the spirit and scope of the invention as defined in the appended claims.

What is claimed is:

1. A viewing window for detecting radiation within a wide-angle region entering through the window, the viewing window comprising:
    a plurality of optical structures defining respective different individual prisms for receiving said radiation;
    said prisms being arranged in a planar array and defining respective entrance angles for said radiation with said angles being different for every viewing angle;
    detector means defining a plurality of discrete areas for receiving respective images thereon; and,
    a plurality of imaging units arranged behind respective ones of said prisms so as to permit each of said imaging units to image the prism corresponding thereto onto a selected one of said discrete areas.

2. The viewing window of claim 1, said prisms being first prisms; a plurality of second prisms arranged behind corresponding ones of said first prisms to form a plurality of pairs of prisms; and, said imaging units being a plurality of optical members disposed between the two prisms of each of said pairs of prisms, respectively, for focusing the rays of the radiation corresponding to the pair of prisms.

3. The viewing window of claim 1, said detector means being photosensitive detector means; and, said wide-angle region being subdivided into a plurality of component solid-angle regions of radiation corresponding to respective ones of said prisms; and, each of said units including a plurality of objectives for imaging the radiation of the corresponding solid-angle region onto the selected one of said discrete areas.

4. The viewing window of claim 3, each of said objectives including at least one converging lens.

5. The viewing window of claim 1, said prisms conjointly defining a flat surface facing toward said wide-angle region.

6. The viewing window of claim 5, comprising a protective window disposed in front of said flat surface defined by said prisms.

7. The viewing window of claim 6, said prisms having respective surfaces for receiving said radiation and for defining said flat surface, said surfaces of said prisms and said protective window conjointly defining a space therebetween; and, fluid means disposed in said space.

8. The viewing window of claim 1, said prisms being mounted so as to cause said individual regions to be arranged as a matrix.

* * * * *